United States Patent
Jain et al.

(10) Patent No.: US 10,326,701 B2
(45) Date of Patent: Jun. 18, 2019

(54) INTELLIGENT SELECTION OF A DESIGNATED FORWARDER AND A MASTER ROUTER FOR ROUTER REDUNDANCY

(71) Applicant: ARRIS Enterprises LLC, Suwanee, GA (US)

(72) Inventors: Nitin Jain, Saratoga, CA (US); Wing-Keung Adam Yeung, Pleasanton, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/476,773

(22) Filed: Mar. 31, 2017

(65) Prior Publication Data

US 2018/0054391 A1 Feb. 22, 2018

Related U.S. Application Data

(60) Provisional application No. 62/451,596, filed on Jan. 27, 2017, provisional application No. 62/376,283, filed on Aug. 17, 2016.

(51) Int. Cl.

| | | |
|---|---|---|
| *H04L 12/24* | (2006.01) | |
| *H04L 12/46* | (2006.01) | |
| *H04L 12/707* | (2013.01) | |
| *H04L 12/741* | (2013.01) | |
| *H04L 12/761* | (2013.01) | |
| *H04L 12/833* | (2013.01) | |

(52) U.S. Cl.
CPC ...... *H04L 47/2458* (2013.01); *H04L 12/4641* (2013.01); *H04L 41/5022* (2013.01); *H04L 45/16* (2013.01); *H04L 45/24* (2013.01); *H04L 45/745* (2013.01)

(58) Field of Classification Search
CPC .......... H04L 45/00; H04L 45/02; H04L 45/28
See application file for complete search history.

(56) References Cited

U.S. PATENT DOCUMENTS

| | | | |
|---|---|---|---|
| 8,695,050 B2* | 4/2014 | Yamagishi | H04N 7/17336 725/118 |
| 8,988,984 B2 | 3/2015 | Marques et al. | |
| 9,031,070 B2 | 5/2015 | Mentze et al. | |
| 2014/0347976 A1 | 11/2014 | Keesara et al. | |
| 2016/0127224 A1 | 5/2016 | Wang | |
| 2016/0308752 A1 | 10/2016 | Hu et al. | |

\* cited by examiner

*Primary Examiner* — Chandrahas B Patel
(74) *Attorney, Agent, or Firm* — Stewart M. Wiener

(57) ABSTRACT

Techniques for intelligent designated forwarder (DF) and master router selection (for router redundancy) are provided. In one embodiment, a network router that is part of a set of network routers connected to a common LAN segment can retrieve a priority value adapted for use by the network router in electing a DF for multicast traffic. The network router can further check for the presence or absence of one or more routes to one or more multicast sources in a routing table of the network router. The network router can then modify the priority value based on the presence or the absence of the one or more routes and can transmit a multicast routing protocol control packet including the modified first priority value to one or more other network routers in the set of network routers.

25 Claims, 5 Drawing Sheets

INTELLIGENT SELECTION OF A DESIGNATED FORWARDER AND A MASTER ROUTER FOR ROUTER REDUNDANCY

CROSS-REFERENCES TO RELATED APPLICATIONS

The present application claims the benefit and priority of U.S. Provisional Patent Application No. 62/376,283, filed Aug. 17, 2016, entitled "METHOD FOR SELECTION OF ACTIVE ROUTER AMONG MULTIPLE MULTICAST CAPABLE ROUTERS IN A LAN SEGMENT FOR ROUTER REDUNDANCY," and U.S. Provisional Patent Application No. 62/451,596, filed Jan. 27, 2017, entitled "SELECTING AN ACTIVE ROUTER AMONG MUTLI-CAST CAPABLE ROUTERS IN A LAN SEGMENT FOR ROUTER REDUNDANCY." The entire contents of these applications are incorporated herein by reference in their entireties for all purposes.

BACKGROUND

Virtual Router Redundancy Protocol, or VRRP, is a networking protocol that enables a group of physical Layer 3 (i.e., Internet Protocol (IP)) routers connected to a LAN (local area network) segment to act in concert as a single, virtual router. One router in the VRRP group, known as the "master" or "active" router, serves as the default gateway for hosts on the LAN segment and actively routes unicast data traffic to/from the hosts. Other routers in the VRRP group, referred to as backup routers, operate in a backup mode and do not route any data traffic. If the master router fails, VRRP allows the routers in the VRRP group to automatically elect one of the backup routers as a replacement for the failed master router (and thus become the new VRRP master). Data traffic is then redirected through the newly elected master router, thereby enabling routing in the LAN segment to continue uninterrupted. An extended version of VRRP, known as VRRP-E, is available on routers developed by Brocade Communications Systems, Inc.

In scenarios where the routers that are connected to a LAN segment are multicast-capable (in other words, they support L3 multicast routing under the PIM (Protocol Independent Multicast) or other multicast protocol standards), one router in the set of multicast-capable routers is typically elected as a designated forwarder (DF) for multicast traffic. The DF is responsible for forwarding all multicast traffic to the LAN segment, which prevents duplicate multicast packets from reaching that segment through different routers in the set.

One issue that exists in these scenarios is that, in prior art routers, the election of the DF is based on static criteria (e.g., a preconfigured or default DF priority value for each router and/or interface IP address) that do not take into account the actual routes installed into each router's multicast and unicast routing tables. This is problematic because multicast forwarding requires an RPF (reverse path forwarding) check in which the route to the multicast source is looked up in a multicast routing table and, if absent, looked up in a unicast routing table. If the route is absent from both tables, the multicast packets are not forwarded. Thus, if the elected DF does not have its routing tables populated with a route to the source (due to, e.g., unstable paths to the source or other network connectivity issues), the RPF check will fail, causing multicast traffic to be inadvertently dropped.

Another issue is that, in the scenario where a set of multicast-capable routers connected to a LAN segment are also part of the same VRRP group, the election of the VRRP master router and the election of the DF are performed using different and separate mechanisms. As noted above, DF election is performed based on a DF priority value and, in the case of a tie with respect to the DF priority value, is performed based on interface IP address. However, the election of the VRRP master is performed based on a separate virtual router ID (VRID) priority value that is specific to VRRP. This means that the elected VRRP master can be different from the elected DF, which causes the unicast and multicast forwarding paths to be different. This, in turn, results in inefficient forwarding and can make troubleshooting more difficult.

SUMMARY

Techniques for intelligent designated forwarder (DF) and master router selection (for router redundancy) are provided. In one embodiment, a network router that is part of a set of network routers connected to a common LAN segment can retrieve a priority value adapted for use by the network router in electing a DF for multicast traffic. The network router can further check for the presence or absence of one or more routes to one or more multicast sources in a routing table of the network router. The network router can then modify the priority value based on the presence or the absence of the one or more routes and can transmit a multicast routing protocol control packet including the modified first priority value to one or more of the other network routers in the set of network routers.

A further understanding of the nature and advantages of the embodiments disclosed herein can be realized by reference to the remaining portions of the specification and the attached drawings.

DETAILED DESCRIPTION

Figure 1:
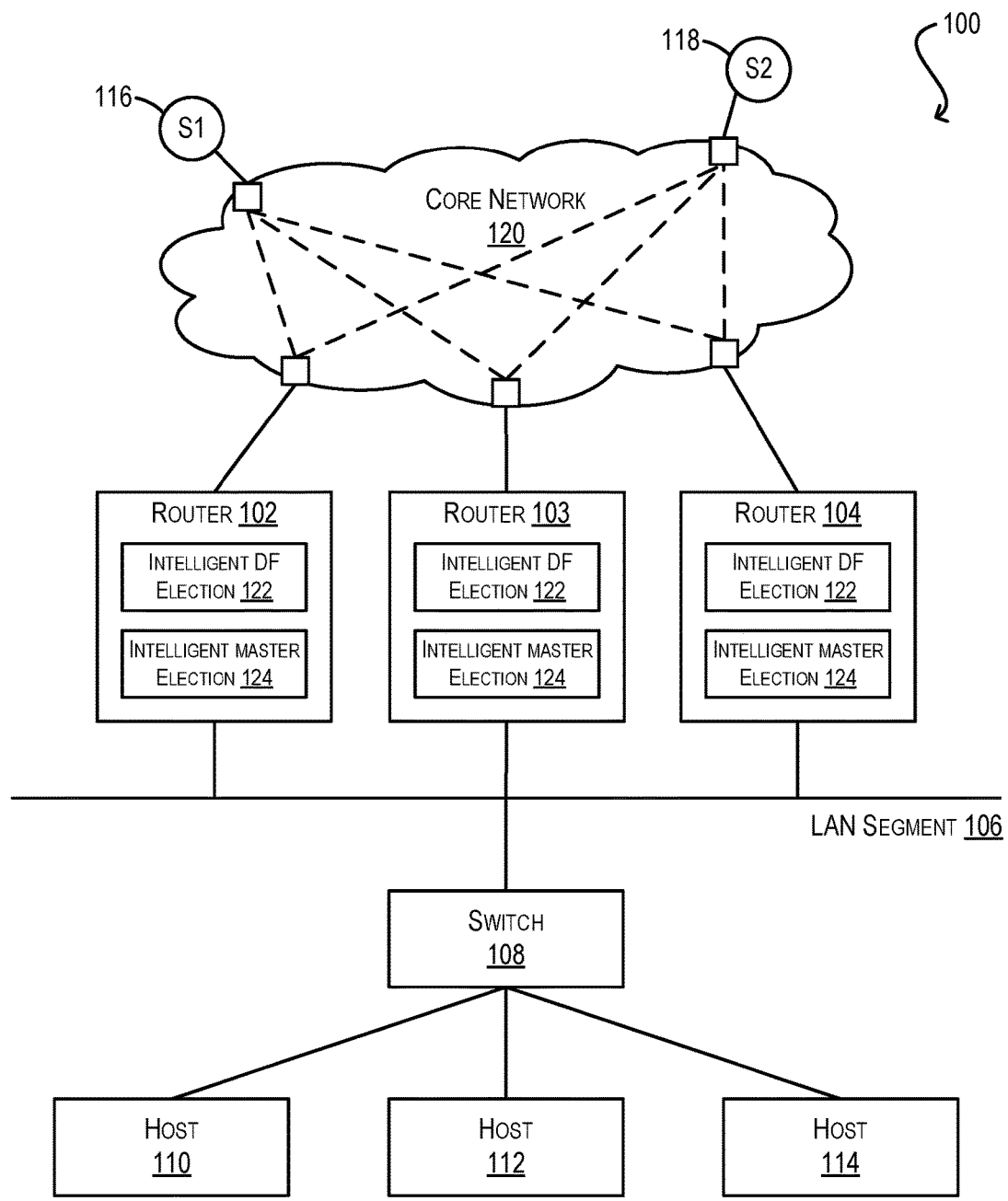
FIG. 1 depicts a block diagram of a system environment according to one embodiment.

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

Embodiments of the present disclosure provide techniques that can be executed by each router in a set of multicast-capable routers connected to a common LAN segment (known as a "multi-access" LAN segment) for more intelligently selecting a designated forwarder (DF) from among the routers in the set.

For example, at the time of carrying out a DF election process, each router can check its multicast and/or unicast routing tables for the presence of one or more routes to multicast sources that are likely to generate multicast traffic. These one or more routes are referred to herein as "core routes" and may be configured/defined by a network administrator in the form of one or more policies. Based on the presence or absence of the core routes in the routing tables, the router can bias its DF priority value to influence the likelihood that it will be elected as the DF for the LAN segment. For example, if router R1 determines that its routing table(s) include one or more core routes, R1 can bias its DF priority value upward such that it is more likely that it will be elected as DF. On the other hand, if R1 determines that its routing table(s) do not include one or more core routes, R1 can bias its DF priority value downward such that it is less likely that it will be elected as DF. R1 can then advertise, via multicast routing protocol control packets (i.e., "hello" packets) its biased DF priority value to the other routers in the set. By performing this process on each router, the router set as a whole can ensure that the most capable router in the set will be selected as the DF for multicast traffic.

In some embodiments, such as when multiple routers are determined to be equally capable in acting as the DF (and thus have the same DF priority value), multicast routing responsibilities can be split among those routers on a per-multicast group basis. In this way, each router can act as the DF for a particular multicast group (or subset of groups), thereby load balancing the routing of multicast traffic across those routers. The details for performing this load balancing are described below.

In further embodiments, in scenarios where the set of multicast-capable routers connected to the LAN segment are also part of a VRRP/VRRP-E group, each router can take into account its biased DF priority value (as determined above) during the VRRP/VRRP-E master election process in order to determine its VRID priority value. For instance, returning to the example of router R1, if the DF priority value for R1 was biased upward based on the presence of core routes in its routing tables, R1 can also bias its VRID priority value upward. This will increase the likelihood that R1 will be elected as the new VRRP/VRRP-E master router. Conversely, if the DF priority value for R1 was biased downward based on the absence of one or more core routes in its routing tables, R1 can also its VRID priority value downwards. This will decrease the likelihood that R1 will be elected as the new VRRP/VRRP-E master router. R1 can then advertise its biased VRID priority value to the other routers in the group. With this technique, the multiple routers on the LAN segment can better synchronize the VRRP/VRRP-E master election process with the DF election process and thus minimize or eliminate situations in which the VRRP/VRRP-E master router and DF diverge (i.e., correspond to different physical routers).

The foregoing and other aspects of the present disclosure are described in further detail in the sections that follow.

2. System Environment

FIG. 1 depicts a system environment 100 in which embodiments of the present disclosure may be implemented. As shown, system environment 100 includes three multicast-capable routers 102, 103, and 104 that are connected to a multi-access LAN segment 106. Multi-access LAN segment 106 includes a Layer 2 switch 108, which is in turn connected to three hosts 110, 112, and 114. Each host 110-114 may join one or more multicast groups for receiving multicast traffic, routed through multicast-capable router 102, 103, or 104, from multicast sources (e.g., sources 116 and 118) located in a core network 120. In FIG. 1, source 116 and source 118 are shown as being connected to routers 102-104 via different multicast distribution trees comprising different routes through core network 120.

Although system environment 100 depicts a specific number of hosts, switches, multicast-capable routers, and multicast sources for purposes of illustration, it should be appreciated that any number of these entities may be supported.

In order to forward multicast traffic from core network 120 to hosts 110-114 on LAN segment 106, routers 102-104 are configured to carry out an election process for electing a designated forwarder (DF). The router that is elected as the DF is responsible for routing all multicast traffic to LAN segment 106. This election process generally involves determining, at each router, a DF priority value that indicates the relative weight or priority for electing the present router as the DF. This DF priority value can be preconfigured for each router by, e.g., a network administrator. Upon determining its DF priority value, each router advertises the value to the other routers. The set of routers as a whole then elects the router with the highest DF priority value as the DF. In the case of a tie between two or more routers that have the same DF priority value, the router with the highest or lowest interface IP address may be elected.

Further, in cases where multicast-capable routers 102-104 are part of a VRRP/VRRP-E group, routers 102-104 are configured to carry out an election process for electing a VRRP/VRRP-E master router. The router that is elected as the VRRP/VRRP-E master is responsible for routing all non-multicast data traffic between core network 120 and network segment 106. The other router(s) operate in a backup mode and are ready to take over master duties in case the elected master fails. The VRRP/VRRP-E master election process generally involves determining, at each router, a virtual router ID (VRID) priority value that indicates the relative weight or priority for electing the present router as the VRRP/VRRP-E master like the DF priority value, this VRID priority value can be preconfigured for each router by, e.g., a network administrator. Upon determining its VRID priority value, each router advertises the value to the other routers. The VRRP/VRRP-E router group as a whole then elects the router with the highest VRID priority value as the master router.

As noted in the Background section, one issue with the DF election process in prior art routers is that the main criterion for perform this election is a value that is statically defined for each router (i.e., the DF priority value). This means that the DF election process cannot dynamically take into account the suitability of each router for acting as the DF under current network conditions (such as, e.g., whether each router has appropriate routes to likely multicast sources in its routing tables for RPF checks).

Another issue is that the VRRP/VRRP-E master router election process is generally separate and independent from the DF election process. This means that, in some cases, the elected VRRP/VRRP-E master router will be different from the elected DF, which can create different paths for unicast and multicast flows on LAN segment 106 and thus result in inefficient forwarding.

To address these and other similar issues, routers 102-104 can each be enhanced to include an intelligent DF election module 122 and/or an intelligent master router election module 124 as shown in FIG. 1. These modules can be implemented in software, hardware, or a combination thereof. As described in section 3 below, intelligent DF election module 122 can enable each router 102-104 to dynamically bias (i.e., modify) its DF priority value during the DF election process based on the presence or absence of certain routes to multicast sources in its multicast and unicast routing tables. Further, as described in section 5 below, intelligent master router election module 124 can enable each router 102-104 to dynamically bias its VRID priority value during the VRRP/VRRP-E master election process based on the DF priority value. Thus, with these two modules, (1) DF election can be performed in a more intelligent manner and (2) the DF and master router election processes can be harmonized, resulting in the selection of a single router in the set of routers connected to LAN segment 106 as both the DF and the VRRP/VRRP-E master router.

It should be appreciated that FIG. 1 is illustrative and not intended to limit embodiments of the present disclosure. For example, the various entities shown in FIG. 1 may be arranged according to different configurations, or may include subcomponents or functions that are not specifically described. One of ordinary skill in the art will recognize other variations, modifications, and alternatives.

3. Intelligent DF Election

Figure 2:
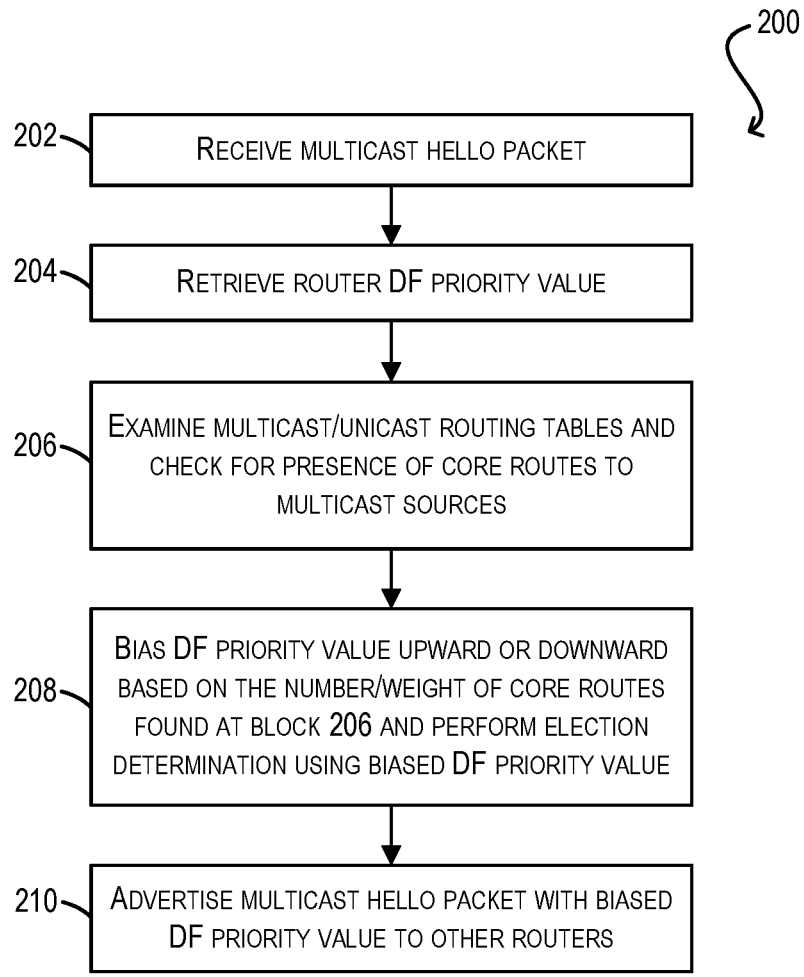
FIG. 2 depicts a workflow for performing intelligent DF election according to one embodiment.

FIG. 2 depicts a workflow 200 that may be executed by intelligent DF election module 122 of each router 102-104 of FIG. 1 for carrying out an intelligent DF election process according to an embodiment.

Starting with block 202, intelligent DF election module 122 can receive a multicast routing protocol control packet (i.e., a "hello" packet) from another multicast-capable router in the same router set (i.e., routers 102-104 connected to LAN segment 106). Such hello packets are conventionally exchanged between multicast-capable routers in order to discover their neighbor routers and to exchange DF priority values as part of the DF election process. The multicast routing protocol to which the control packet pertains may be PIM (Protocol Independent Multicast) or any other multicast routing protocol known in the art.

At block 204, intelligent DF election module 122 can retrieve a preconfigured DF priority value for the current router. This DF priority value may be preconfigured by, e.g., a system administrator. In the case where no DF priority value has been preconfigured, the module may use a default value.

At block 206, intelligent DF election module 122 can examine the multicast and unicast routing tables of the current router and can check for the presence of one or more "core routes" in the tables. As mentioned previously, a core route is a route to a source host (or subnet) that is likely to generate multicast transmissions. These core routes can be specified (either as groups of routes or individual routes) in a policy that is defined by a network administrator. The policy may also define a weighting for each core route (or groups of core routes).

At block 208, intelligent DF election module 122 can bias, or change, the DF priority value based on the core routes found at block 206 and perform its election determination based on the biased DF priority value. For example, intelligent DF election module 122 can bias the DF priority upward (i.e., increase the value) if one or more core routes are present in the routing table. Conversely, module 122 can bias the DF priority downward (i.e., decrease the value) if one or more core routes are absent from the route table. As part of this process, module 122 can take into account any route weightings included in the user-defined policy, such that the presence or absence of core routes with higher weightings more strongly affect the degree of biasing.

Finally, at block 210, intelligent DF election module 122 can advertise a new multicast routing protocol control packet (i.e., hello packet) to the other routers in the set of routers connected to LAN segment 106, where the new multicast routing protocol control packet includes the DF priority value determined/biased at block 208. In this way, the other routers can take this information into account in order to determine who should be elected as the new DF. Since the DF priority value is biased based on the number and weightings of core routes found in each router's routing tables, this workflow will generally ensure that the router with the most matching/highest weighted core routes (i.e., with the highest DF priority) will be elected as the new DF. In the case of a tie in DF priority, another criteria such as IP address can be used to break the tie.

It should be appreciated that FIG. 2 is illustrative and various modifications are possible. For example, in some cases frequent route addition or deletion to the router's routing tables can result in oscillation of the elected DF. In this case, if one or more core routes oscillate (i.e., are added or deleted) at more than a certain preconfigured rate, those routes will not be considered when biasing the DF priority value. One of ordinary skill in the art will recognize other modifications, variations, and alternatives.

4. Electing Multiple DFs for Load Balancing

In some embodiments, multiple routers in the set of routers 102-104 connected to LAN segment 106 may be elected as a DF. In these embodiments, each elected router may act as a DF for multicast traffic directed to a particular multicast group (or set of multicast groups). In this way, the routing of multicast traffic to LAN segment 106 can be load balanced across multiple DFs (rather than being centralized in a single DF). This may occur if, e.g., multiple routers are determined to have the same (i.e., tied) DF priority value, or if a network administrator has configured the routers to act in this manner.

Figure 3:
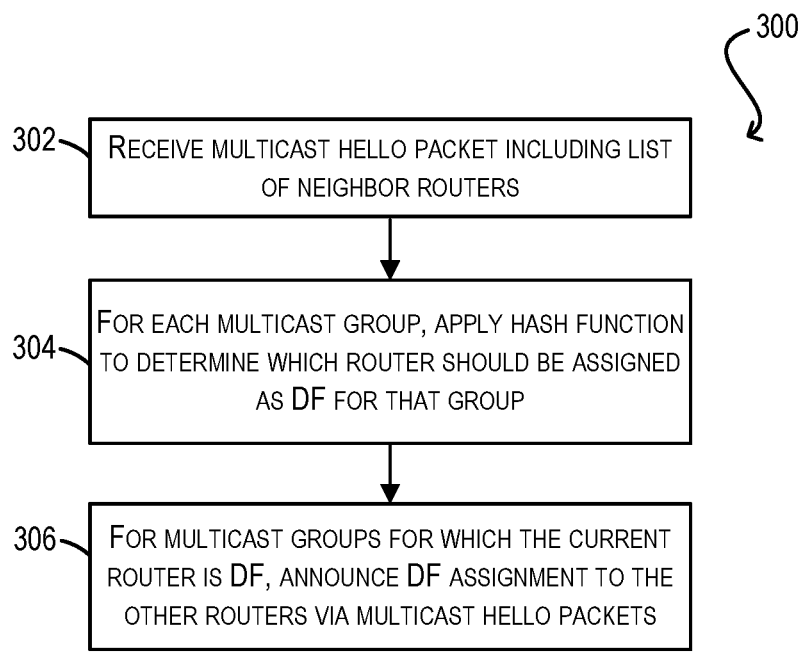
FIG. 3 depicts a workflow for electing multiple DFs for load balancing purposes according to one embodiment.

FIG. 3 depicts a workflow 300 that may be executed by each multicast-capable router 102-104 connected to LAN segment 106 in FIG. 1 for electing multiple DFs according to an embodiment. At block 302, each router can receive a multicast routing protocol control packet (i.e., hello packet) from the other multicast-capable routers connected to the same LAN segment, where the control packet includes a list those neighbor routers and their interface IP addresses.

Once all of the multicast-capable routers connected in LAN segment 106 have synchronized and received a complete list of neighbor routers, each router can, for each multicast group address defined in its IP multicast forwarding tables, compute a hash function that takes as input (1) a list of the IP addresses of all of the multicast-capable routers connected to the LAN segment, (2) the multicast group address, and (3) a group mask (block 304). The purpose of the group mask is to mask out the bits of the multicast group address that will generally be static (and thus not useful for the hash computation). The output of this hash function will correspond to a number from zero to N−1, where N is the total number of routers connected to the LAN segment. Thus, this output will identify a particular router that should assigned as the DF for the multicast group identified by the multicast group address. Note that each router in the set of routers will perform the same hash computation in a distributed manner, and thus each router should generate the same DF assignments.

Finally, at block 306, each router that is assigned as a DF for a particular multicast group or set of multicast groups can announce itself to the other routers in the LAN segment via another multicast hello packet. This allows the other routers to learn this DF assignment (i.e., bind the multicast group address to the assigned router). At the time a new router is added to the LAN segment, the new router can learn the existing DF bindings via the periodic hello packets that are exchanged between the routers. These bindings will generally stay in place while multicast receivers continue to send IGMP group reports. If a particular multicast group ages out (i.e., no group reports are received for that group after a predefined period of time), the DF binding for that group can be removed from the routers, and a new DF can be assigned when a new receiver in the group joins and causes workflow 300 to repeat.

5. Intelligent Master Router Election

Figure 4:
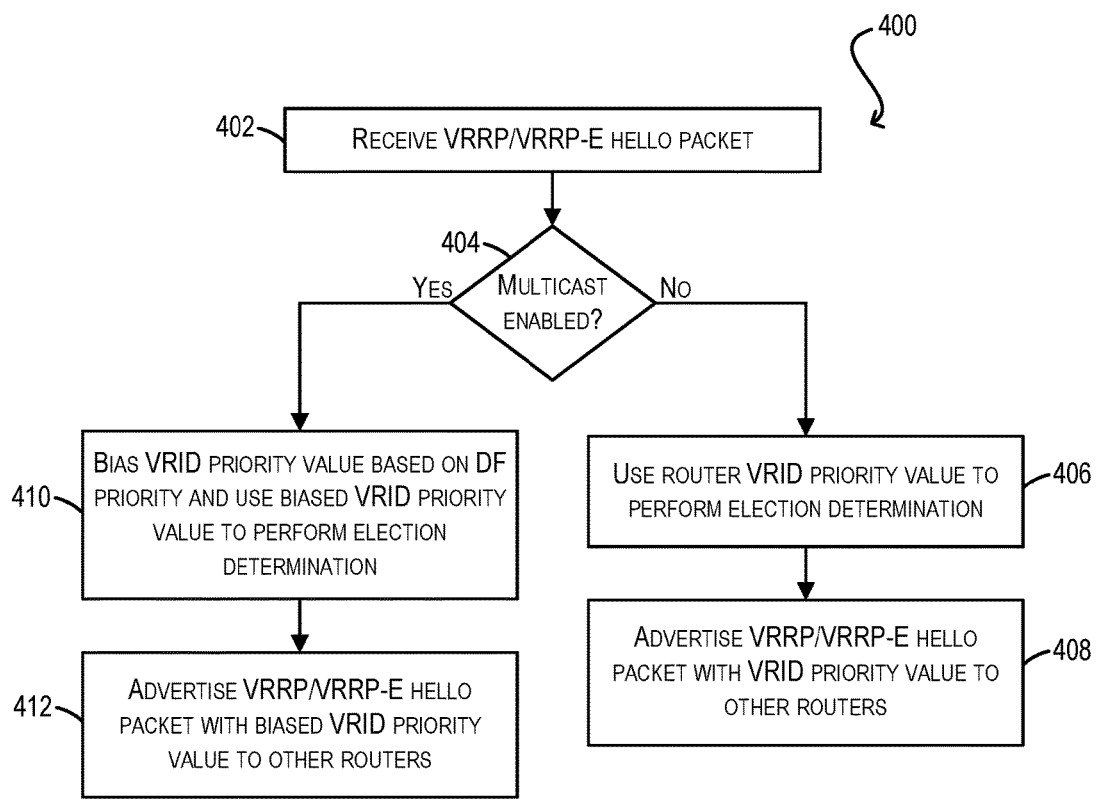
FIG. 4 depicts a workflow for performing intelligent VRRP/VRRP-E master router election according to one embodiment.

Turning now to VRRP/VRRP-E master election, FIG. 4 depicts a workflow 400 that may be executed by intelligent master router election module 124 of each router 102-104 of FIG. 1 for carrying out an intelligent master router election process in scenarios where routers 102-104 are part of a VRRP/VRRP-E group according to an embodiment. It is assumed that workflow 400 is performed after workflow 200 of FIG. 2, and thus module 124 has access to the biased DF priority value(s) determined at block 208 of workflow 200.

Starting with block 402, intelligent master router election module 124 can receive a VRRP/VRRP-E hello packet from another router in the same VRRP/VRRP-E router group. Such hello packets are conventionally exchanged between VRRP/VRRP-E routers in order to elect a master.

At block 404, the module can check whether multicast is enabled on the current router. If not, the module can simply use the router's existing VRID priority value to determine whether it should be the new master (block 406) and can advertise the VRID priority in a new VRRP/VRRP-E hello packet that is sent to other routers in the same group (block 408).

However, if the current router is multicast enabled, the module can use the VRID priority value in combination with its biased DF priority value (as determined in workflow 200) in order to determine whether it should be the new master (block 410). More specifically, intelligent master router election module 124 can bias the VRID priority value upward if the DF priority value is high (or was similarly biased upward in workflow 200), and can bias VRID priority value downward if the DF priority value is low (or was similarly biased downward in workflow 200). In this way, intelligent master router election module 124 can increase the likelihood that the same router in the router group will be elected as both the VRRP/VRRP-E master and the DF. Finally, at block 412, the module can advertise the biased VRID priority value in a new VRRP/VRRP-E hello packet that is sent to other routers in the same VRRP/VRRP-E group.

6. Example Network Router

Figure 5:
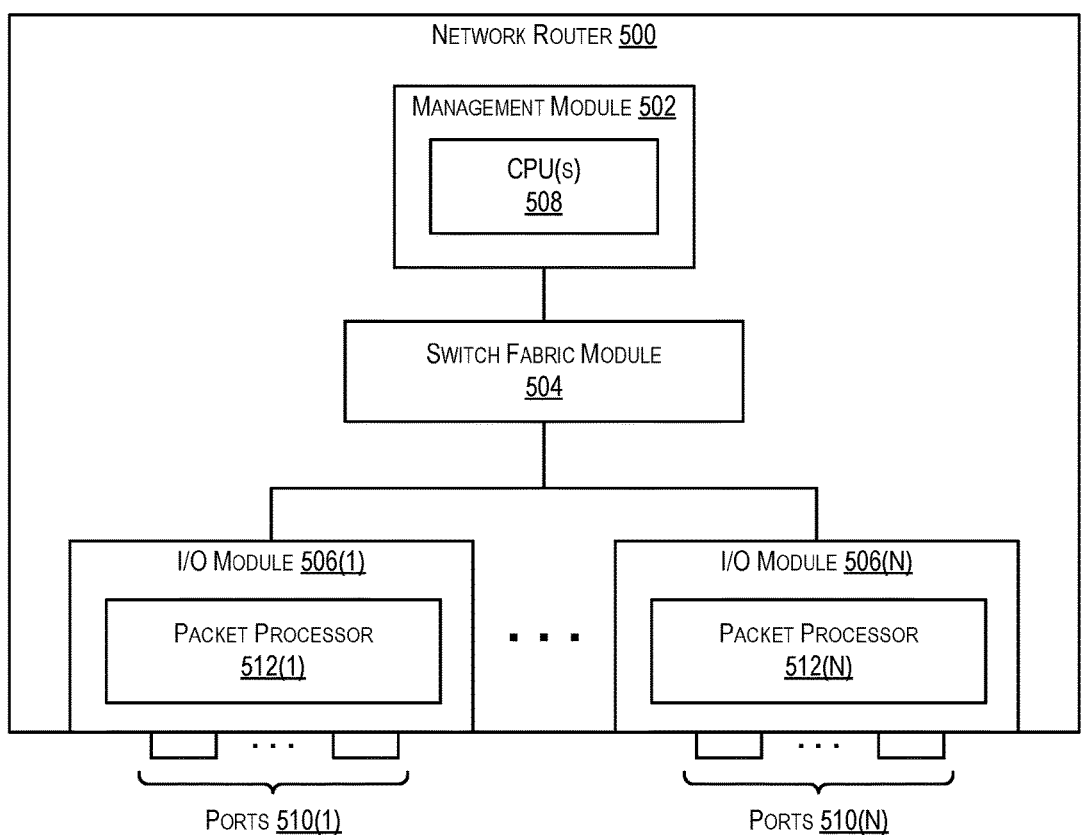
FIG. 5 depicts a block diagram of a network router according to one embodiment.

FIG. 5 depicts an example network router 500 according to an embodiment. Network router 500 can be used to implement, e.g., routers 102-104 described with respect to FIG. 1.

As shown, network router 500 includes a management module 502, a switch fabric module 504, and a number of I/O modules 506(1)-506(N). Management module 502 includes one or more management CPUs 508 for managing/controlling the operation of the router. Each management CPU 508 can be a general purpose processor, such as a PowerPC, Intel, AMD, or ARM-based processor, that operates under the control of software stored in an associated memory (not shown).

Switch fabric module 504 and I/O modules 506(1)-506(N) collectively represent the data, or forwarding, plane of network router 500. Switch fabric module 504 is configured to interconnect the various other modules of network router 500. Each I/O module 506(1)-506(N) can include one or more input/output ports 510(1)-510(N) that are used by network router 500 to send and receive data packets. Each I/O module 506(1)-506(N) can also include a packet processor 512(1)-512(N). Packet processor 512(1)-512(N) is a hardware processing component (e.g., an FPGA or ASIC) that can make wire speed decisions on how to handle incoming or outgoing data packets.

It should be appreciated that network router 500 is illustrative and not intended to limit embodiments of the present invention. Many other configurations having more or fewer components than network router 500 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
retrieving, by a network router that is part of a set of network routers connected to a LAN (local area network) segment, a first priority value adapted for use by the network router in electing a designated forwarder for multicast traffic, wherein the first priority value is a designated forwarder priority value;
checking, by the network router, for presence or absence of one or more routes to one or more multicast sources in a routing table of the network router;
modifying, by the network router, the first priority value based on the presence or the absence of the one or more routes; and
transmitting, by the network router, a multicast routing protocol control packet including the modified first priority value to one or more other network routers in the set of network routers.

2. The method of claim 1 wherein multiple network routers in the set of network routers are elected as designated forwarders for the multicast traffic, each network router in the multiple network routers being configured to forward multicast traffic for a different multicast group.

3. The method of claim 1 wherein the first priority value and the one or more multicast sources are pre-configured on the network router by a network administrator.

4. The method of claim 1 wherein modifying the first priority value comprises:
  biasing the first priority value upward if one or more routes to the one or more multicast sources are found in the routing table; and
  biasing the first priority value downward if one or more routes to the one or more multicast sources are not found in the routing table.

5. The method of claim 1 wherein the set of network routers are configured to act in concert as a single virtual router, and wherein the method further comprises:
  retrieving a second priority value adapted for use by the network router in electing a master router for the virtual router;
  modifying the second priority value based on the modified first priority value; and
  transmitting a router redundancy protocol control packet including the modified second priority value to one or more other network routers in the set of network routers.

6. The method of claim 5 wherein modifying the second priority value comprises:
  biasing the second priority value upward if the first priority value was biased upward; and
  biasing the second priority value downward if the first priority value was biased downward.

7. The method of claim 5 wherein the second priority value is a virtual router ID (VRID) priority value.

8. A method comprising:
  retrieving, by a network router that is part of a set of network routers connected to a LAN (local area network) segment, a first priority value adapted for use by the network router in electing a designated forwarder for multicast traffic, the set of network routers being configured to act in concert as a single virtual router;
  checking, by the network router, for presence or absence of one or more routes to one or more multicast sources in a routing table of the network router;
  modifying, by the network router, the first priority value based on the presence or the absence of the one or more routes;
  transmitting, by the network router, a multicast routing protocol control packet including the modified first priority value to one or more other network routers in the set of network routers,
  retrieving, by the network router, a second priority value adapted for use by the network router in electing a master router for the virtual router;
  modifying, by the network router, the second priority value based on the modified first priority value; and
  transmitting, by the network router, a router redundancy protocol control packet including the modified second priority value to one or more other network routers in the set of network routers.

9. A non-transitory computer readable storage medium having stored thereon program code executable by a network router that is part of a set of network routers connected to a LAN (local area network) segment, the program code comprising:
  code that causes the network router to retrieve a first priority value adapted for use by the network router in electing a designated forwarder for multicast traffic, wherein the first priority value is a designated forwarder priority value;
  code that causes the network router to check for presence or absence of one or more routes to one or more multicast sources in a routing table of the network router;
  code that causes the network router to modify the first priority value based on the presence or the absence of the one or more routes; and
  code that causes the network router to transmit a multicast routing protocol control packet including the modified first priority value to one or more other network routers in the set of network routers.

10. The non-transitory computer readable storage medium of claim 9 wherein multiple network routers in the set of network routers are elected as designated forwarders for the multicast traffic, each network router in the multiple network routers being configured to forward multicast traffic for a different multicast group.

11. The non-transitory computer readable storage medium of claim 9 wherein the first priority value and the one or more multicast sources are pre-configured on the network router by a network administrator.

12. The non-transitory computer readable storage medium of claim 9 wherein the code that causes the network router to modify the first priority value comprises:
  code that causes the network router to bias the first priority value upward if one or more routes to the one or more multicast sources are found in the routing table; and
  code that causes the network router to bias the first priority value downward if one or more routes to the one or more multicast sources are not found in the routing table.

13. The non-transitory computer readable storage medium of claim 9 wherein the set of network routers are configured to act in concert as a single virtual router, and wherein the program code further comprises:
  code that causes the network router to retrieve a second priority value adapted for use by the network router in electing a master router for the virtual router;
  code that causes the network router to modify the second priority value based on the modified first priority value; and
  code that causes the network router to transmit a router redundancy protocol control packet including the modified second priority value to one or more other network routers in the set of network routers.

14. The non-transitory computer readable storage medium of claim 13 wherein the code that causes the network router to modify the second priority value comprises:
  code that causes the network router to bias the second priority value upward if the first priority value was biased upward; and
  code that causes the network router to bias the second priority value downward if the first priority value was biased downward.

15. The non-transitory computer readable storage medium of claim 13 wherein the second priority value is a virtual router ID (VRID) priority value.

16. A method comprising:
  retrieving, by a network router that is part of a set of network routers connected to a LAN (local area network) segment, a first priority value adapted for use by the network router in electing a designated forwarder for multicast traffic;
  checking, by the network router, for presence or absence of one or more routes to one or more multicast sources in a routing table of the network router;

modifying, by the network router, the first priority value based on the presence or the absence of the one or more routes, wherein the modifying comprises:
  biasing the first priority value upward if one or more routes to the one or more multicast sources are found in the routing table; and
  biasing the first priority value downward if one or more routes to the one or more multicast sources are not found in the routing table; and
transmitting, by the network router, a multicast routing protocol control packet including the modified first priority value to one or more other network routers in the set of network routers.

17. A method comprising:
retrieving, by a network router that is part of a set of network routers connected to a LAN (local area network) segment, a first priority value adapted for use by the network router in electing a designated forwarder for multicast traffic;
checking, by the network router, for presence or absence of one or more routes to one or more multicast sources in a routing table of the network router;
modifying, by the network router, the first priority value based on the presence or the absence of the one or more routes; and
transmitting, by the network router, a multicast routing protocol control packet including the modified first priority value to one or more other network routers in the set of network routers,
wherein multiple network routers in the set of network routers are elected as designated forwarders for the multicast traffic, each network router in the multiple network routers being configured to forward multicast traffic for a different multicast group.

18. A network router that is part of a set of network routers connected to a LAN (local area network) segment, the network router comprising:
  a processor; and
  a non-transitory computer readable medium having stored thereon program code that, when executed by the processor, causes the processor to:
    retrieve a first priority value adapted for use by the network router in electing a designated forwarder for multicast traffic, wherein the first priority value is a designated forwarder priority value;
    check for presence or absence of one or more routes to one or more multicast sources in a routing table of the network router;
    modify the first priority value based on the presence or the absence of the one or more routes; and
    transmit a multicast routing protocol control packet including the modified first priority value to one or more other network routers in the group of network routers.

19. The network router of claim 18 wherein the first priority value and the one or more multicast sources are pre-configured on the network router by a network administrator.

20. The network router of claim 18 wherein the program code that causes the processor to modify the first priority value comprises program code that causes the processor to:
  bias the first priority value upward if one or more routes to the one or more multicast sources are found in the routing table; and
  bias the first priority value downward if one or more routes to the one or more multicast sources are not found in the routing table.

21. The network router of claim 18 wherein multiple network routers in the set of network routers are elected as designated forwarders for the multicast traffic, each network router in the multiple network routers being configured to forward multicast traffic for a different multicast group.

22. The network router of claim 18 wherein the set of network routers are configured to act in concert as a single virtual router, and wherein the program code further causes the processor to:
  retrieve a second priority value adapted for use by the network router in electing a master router for the virtual router;
  modify the second priority value based on the modified first priority value; and
  transmit a router redundancy protocol control packet including the modified second priority value to one or more other network routers in the set of network routers.

23. The network router of claim 22 wherein the second priority value is a virtual router ID (VRID) priority value.

24. The network router of claim 22 wherein the program code that causes the processor to modify the second priority value comprises program code that causes the processor to:
  bias the second priority value upward if the first priority value was biased upward; and
  bias the second priority value downward if the first priority value was biased downward.

25. A method comprising:
retrieving, by a network router that is part of a set of network routers connected to a LAN (local area network) segment, a first priority value adapted for use by the network router in electing a designated forwarder for multicast traffic;
checking, by the network router, for presence or absence of one or more routes to one or more multicast sources in a routing table of the network router;
modifying, by the network router, the first priority value based on the presence or the absence of the one or more routes; and
transmitting, by the network router, a multicast routing protocol control packet including the modified first priority value to one or more other network routers in the set of network routers,
wherein the first priority value and the one or more multicast sources are pre-configured on the network router by a network administrator.

* * * * *